Aug. 14, 1956  W. A. ENDTER  2,758,862
LATCHING MECHANISMS
Filed Feb. 16, 1952  6 Sheets-Sheet 1
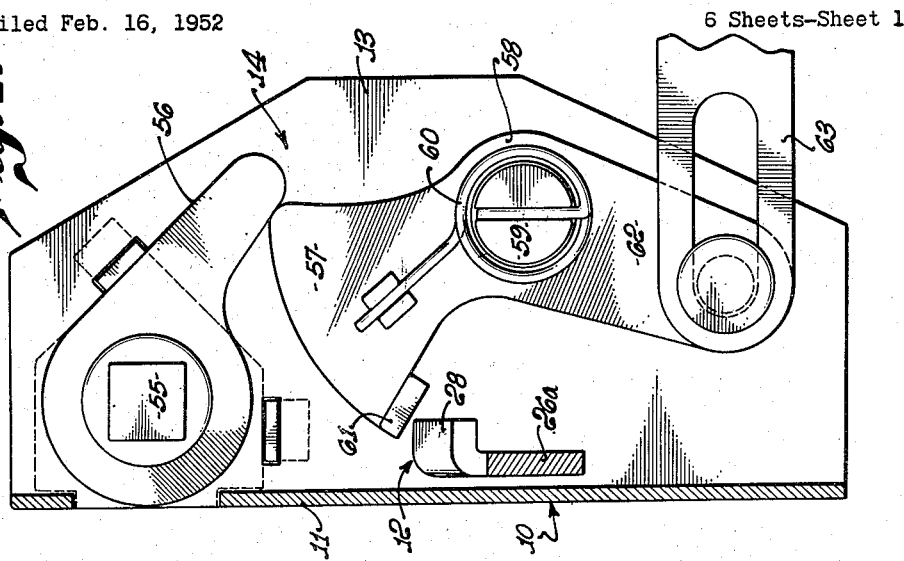
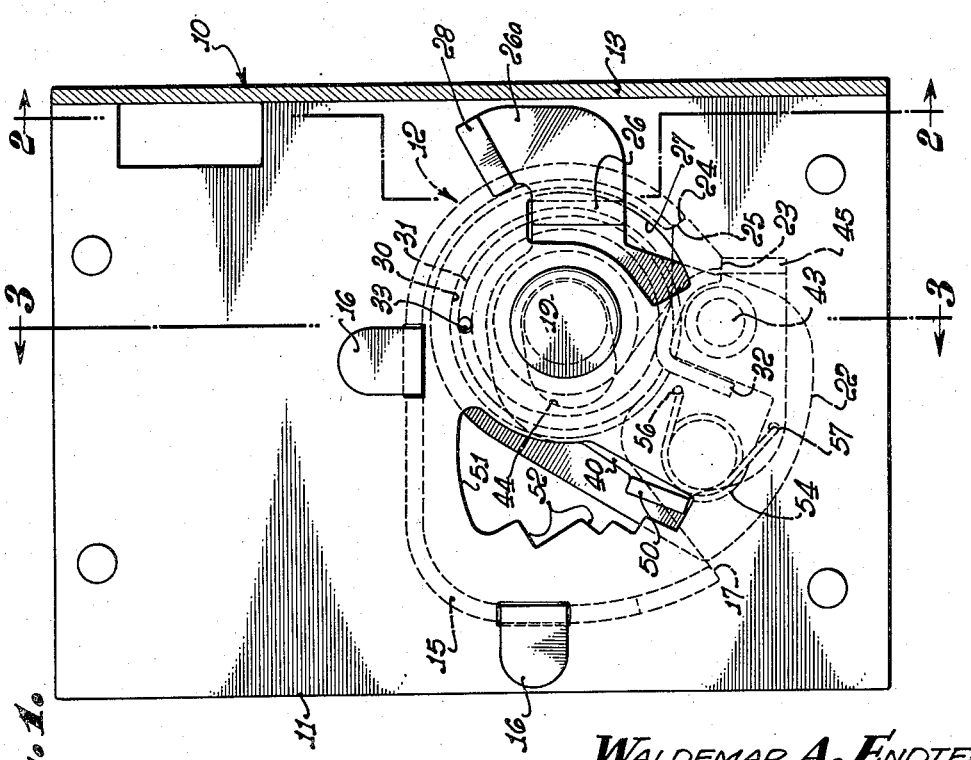
WALDEMAR A. ENDTER,
INVENTOR.
BY
ATTORNEY.

Aug. 14, 1956 W. A. ENDTER 2,758,862
LATCHING MECHANISMS
Filed Feb. 16, 1952 6 Sheets-Sheet 2
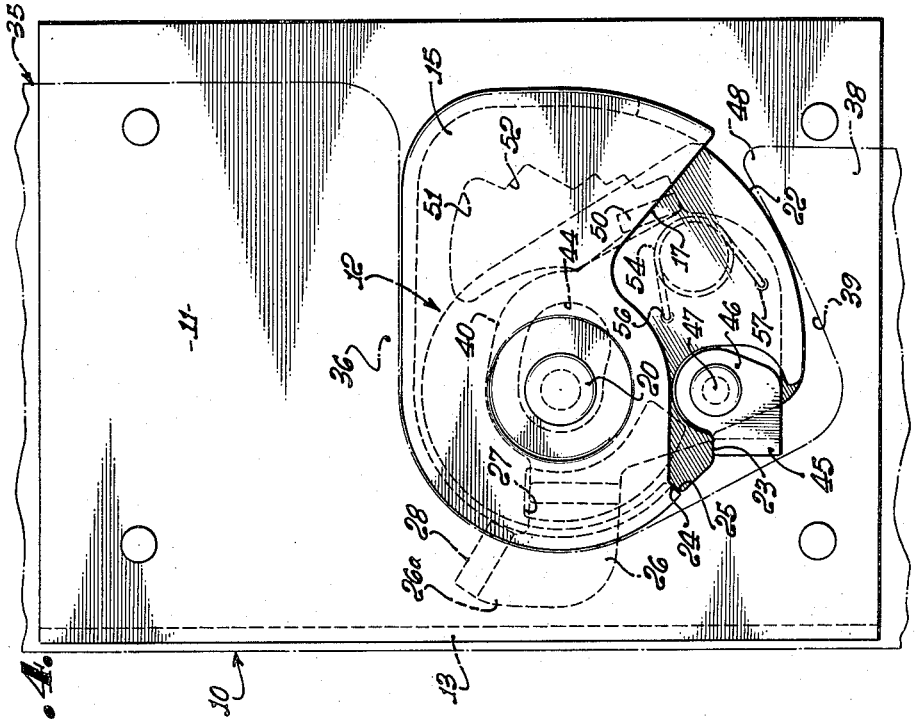
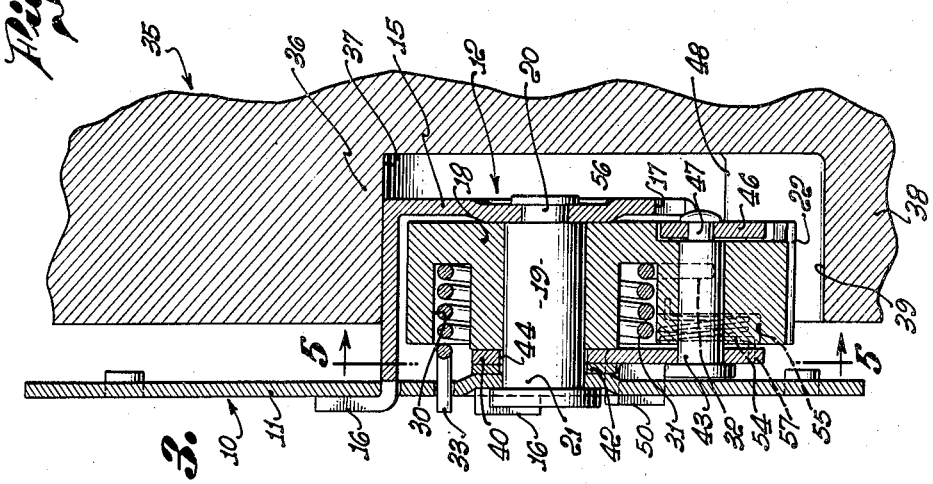
WALDEMAR A. ENDTER,
INVENTOR.
BY
ATTORNEY.

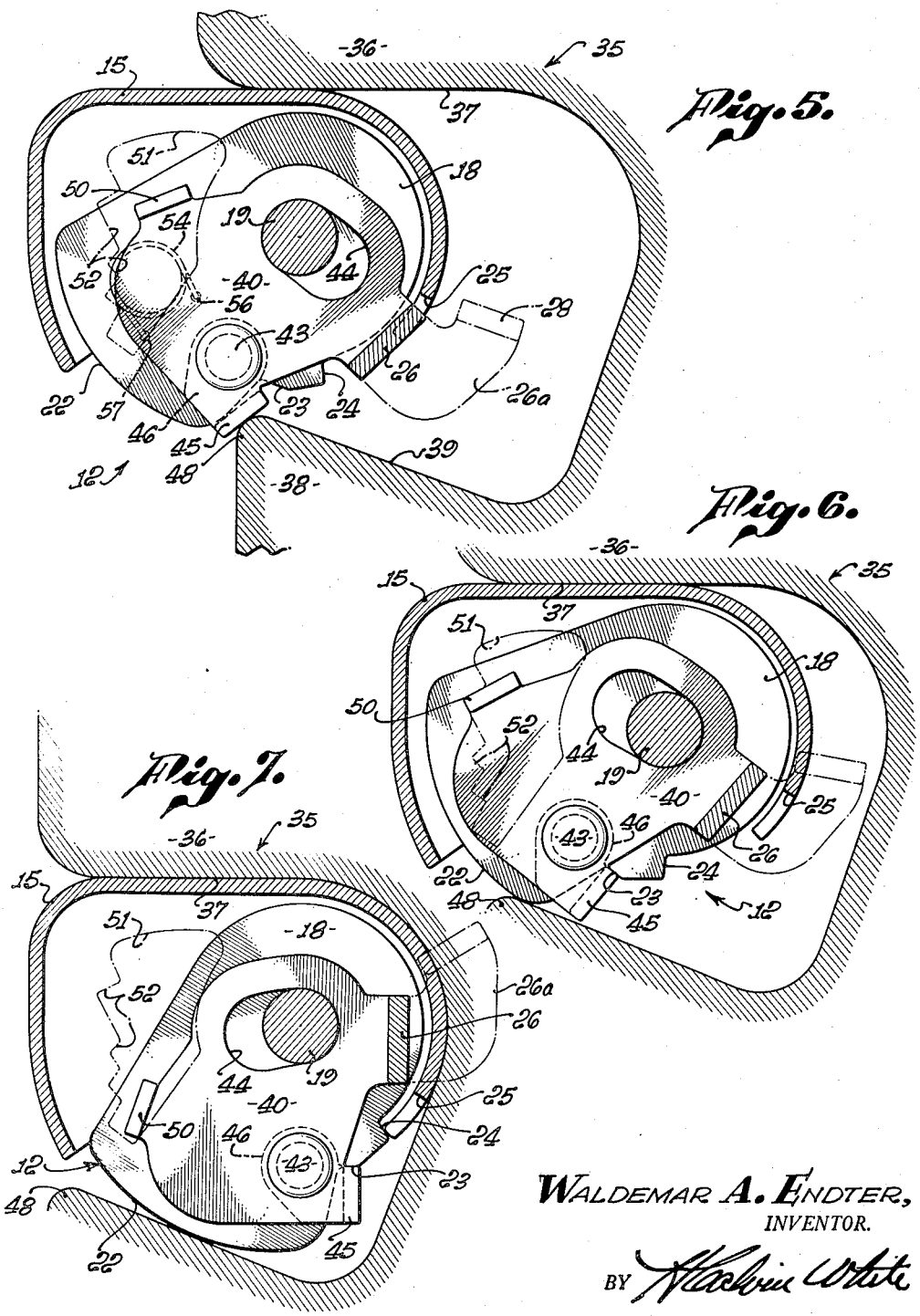

Aug. 14, 1956 W. A. ENDTER 2,758,862
LATCHING MECHANISMS
Filed Feb. 16, 1952 6 Sheets-Sheet 4
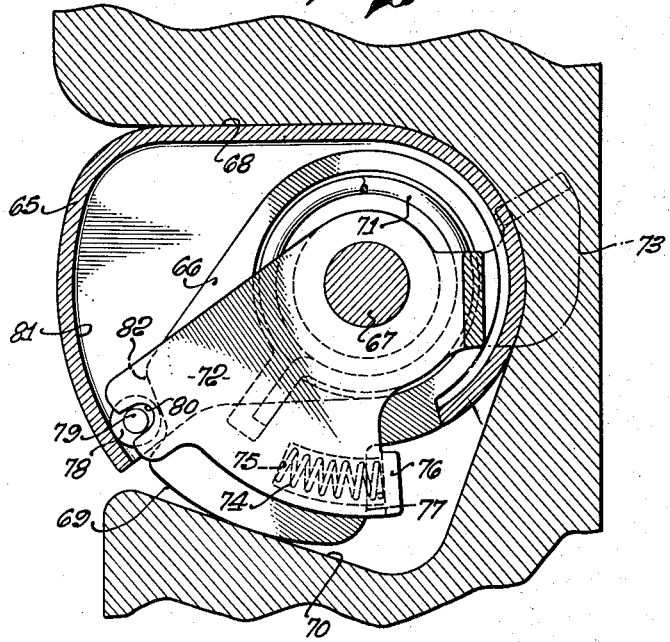
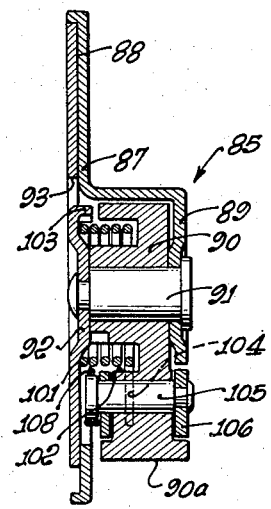
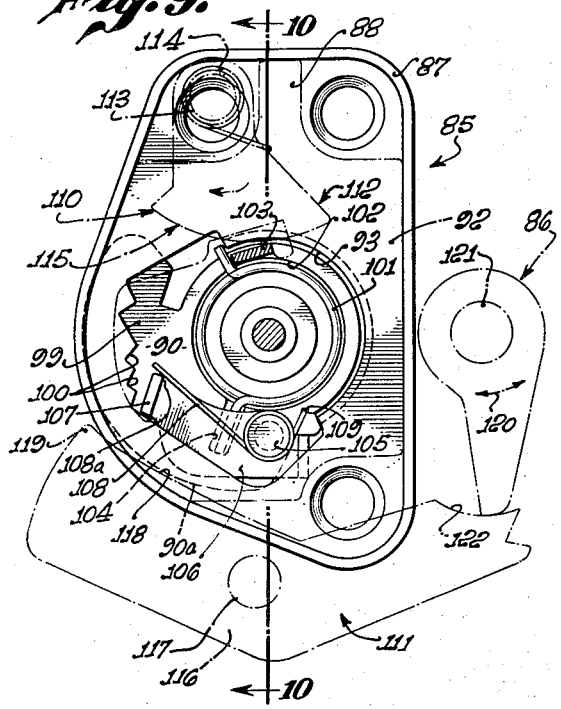
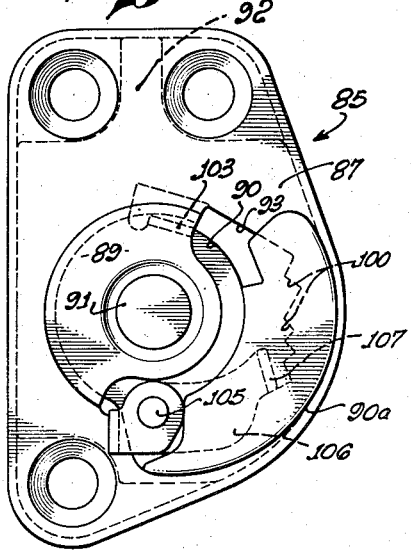
INVENTOR.
WALDEMAR A. ENDTER,
BY
ATTORNEY.

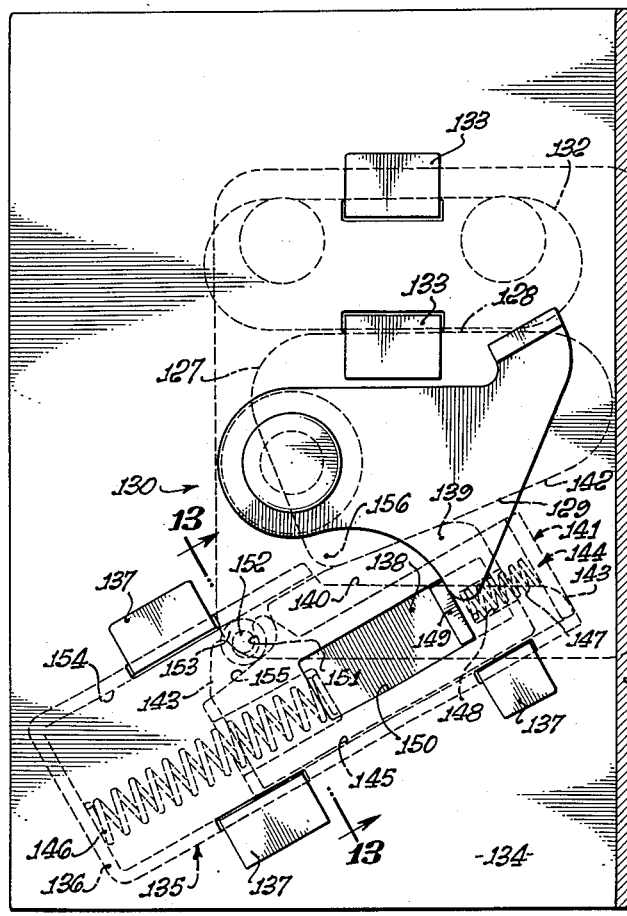
Fig. 12.
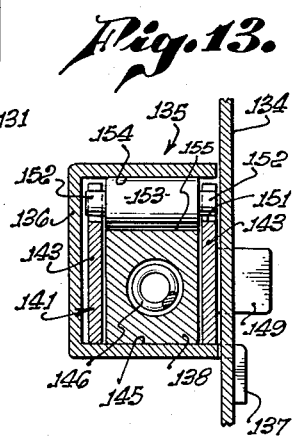
Fig. 13.
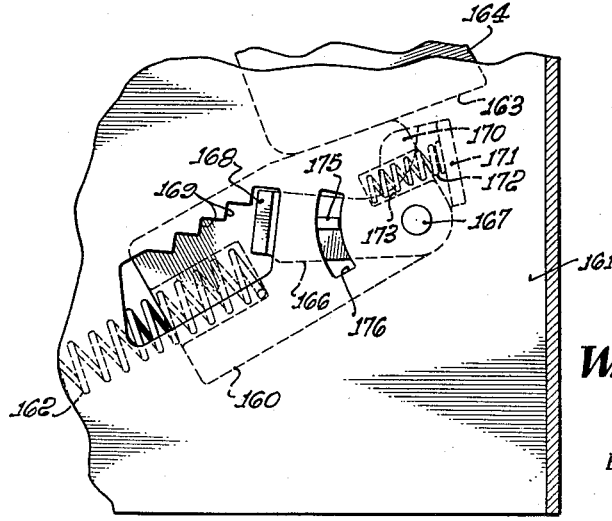
Fig. 14.
WALDEMAR A. ENDTER,
INVENTOR.
ATTORNEY.

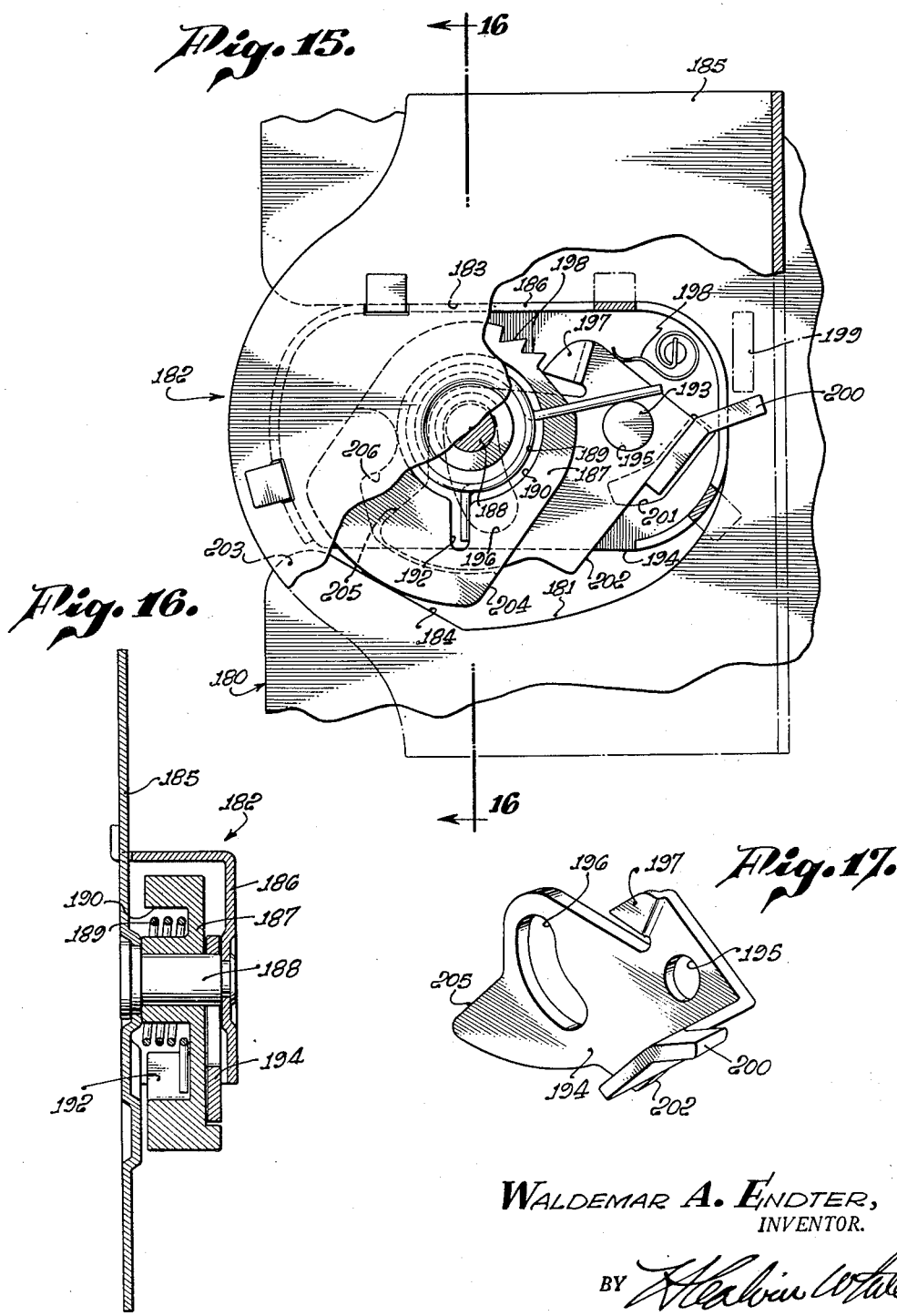

United States Patent Office 2,758,862
Patented Aug. 14, 1956

2,758,862

LATCHING MECHANISMS

Waldemar A. Endter, Long Beach, Calif.

Application February 16, 1952, Serial No. 271,932

10 Claims. (Cl. 292—165)

This invention has to do generally with latching mechanisms applicable typically to automobile doors, and is directed particularly to improvements in take-up latches of the type employing a movable spring urged bolt adapted to override a keeper face and then advance along an inclined surface of the keeper in effecting a progressive take-up action.

The invention is primarily concerned with the prevention of releasing or antilatching movement of the bolt preferably from any of different latched locations ranging from an initial safety catch position to final home or fully latched position. Having a take-up action accomplished through progressive wedging engagement with its keeper, the bolt may be subject to antilatching displacement along the keeper as when subjected to constant door opening pressure accompanied by vibration. My primary object is to positively prevent such displacement of the bolt by incorporating in a latch mechanism having desirably practicable simplicity and capacity for low cost manufacture, a bolt holding or blocking device which responds automatically to retain the bolt within the range of its latched positions.

Structurally the invention contemplates employing a simple body and latch bolt structure, in conjunction with a holding element in effect interposed between the bolt and body and operable to block the bolt against antilatching movement from any of different latched positions.

Desirably, the blocking function of the element is accomplished by spring action to positively assure retention of the bolt at different locations within the range of its travel in latched positions. As will appear, release of the bolt from blocked and latched condition may be effected by manual release of the holding element and antilatching displacement of the bolt, or I may employ a releasable type keeper which upon retraction, permits restoration of the bolt and holding element to the positions which they assume in unlatched condition.

A feature of particular importance is the provision of a control for the blocking element or means, operable by engagement with the keeper to release the bolt for antilatching movement during its travel in overriding relation with the keeper. In this connection the invention contemplates a blocking element control, which may be a part of a single blocking element, so constructed and arranged as to have with the bolt, sequential cooperation with the keeper in that by virtue of an initial displacement caused by engagement with the keeper, the blocking element is released from holding engagement with the bolt, following which both the element and bolt are displaceable by the keeper in a direction corresponding to antilatching travel of the bolt, and the element and bolt then move reversely as the bolt enters the keeper and is spring urged along its inclined surface.

All the various features and objects of the invention, as well as the details of certain typical and illustrative embodiments, will be understood from the following description of those embodiments as shown by the accompanying drawings, in which:

Fig. 1 is a view illustrating a first embodiment of the invention, the view appearing in elevation and taken at the inside of one of the case flange sections;

Fig. 2 is a section taken as indicated by line 2—2 of Fig. 1, illustrating particularly the manually actuated operators for the Fig. 1 mechanism;

Fig. 3 is a cross section taken on line 3—3 of Fig. 1, illustrating also the keeper parts;

Fig. 4 is a view similar to Fig. 1, showing in elevation the latch parts as seen at the outside of the case;

Fig. 5 is a section taken on line 5—5 of Fig. 3 showing the latch parts displaced in an antilatching direction during the course of an initial engagement with the keeper.

Figs. 6 and 7 are similar to Fig. 5 illustrating the positions assumed by the parts as the bolt advances to full home position;

Fig. 8 is a view similar to Fig. 7 illustrating a variational embodiment of the invention;

Fig. 9 shows another variational form of the invention as viewed in elevation from the inside of the latch mechanism;

Fig. 10 is a cross section on line 10—10 of Fig. 9;

Fig. 11 shows in elevation the mechanism of Figs. 9 and 10, as viewed from the outside;

Fig. 12 shows in elevation, as viewed from the inside of the case, a further embodiment of the invention;

Fig. 13 is a cross section on line 13—13 of Fig. 12;

Fig. 14 is a fragmentary view illustrating a modification of the Fig. 12 embodiment;

Fig. 15 is a view similar to Fig. 7 showing still another form of the invention;

Fig. 16 is a cross section on line 16—16 of Fig. 15, and

Fig. 17 is a showing in perspective of the dogging element embodied in the Fig. 15 mechanism.

As previously indicated, the latch mechanisms contemplated by the invention may be constructed and adapted for the latching of automobile doors, and as such, may be mounted on a body structure including an angular case 10 having a flange 11 carrying the bolt and dogging element assembly generally indicated at 12, and a second right angle flange 13 on the inside of which is mounted the operating mechanism generally indicated at 14, see Fig. 2. The body or case structure may be regarded also as including the bolt housing 15 secured to the case flange 11 as by the turned ears 16, the bottom of the housing being open and terminating along the edge 17, see for example Fig. 4.

The latch bolt 18 is contained within the housing and is rotatably carried by a pin 19 terminating at 20 in the outer wall in the housing, and retained at its opposite end 21 within an opening in the case flange 11. As most clearly illustrated in Figs. 5 to 7, the bolt 18 is shown to have a curved keeper engaging face 22 projecting out of and below the housing 15, this bolt face having with respect to the axis of rotation of the bolt at the axis of pin 19, increasing radius of curvature in a counterclockwise direction. At its under side the bolt has a shoulder 23 engageable by the dogging element, as will later appear, and a second shoulder 24 engageable against the housing shoulder 25 to limit rotation of the bolt in a latching direction. Referring to Fig. 3, the bolt contains annular recess 30 within which is accommodated a coil spring 31 one end of which terminates at 32 in the bolt and the opposite end at 33 within the body flange 11. The function of the spring is to constantly urge the bolt in a latching direction within the full rotative range of the bolt movement.

The invention contemplates use in conjunction with the bolt and housing assembly of any of various types and designs of keepers characterized in that the keeper, or a keeper part is positioned in the path of bodily movement of the bolt so that upon engagement therewith the bolt overrides a high point of the keeper and then is urged by the bolt spring along an inclined surface of the keeper to effect a progressive camming and take-up action. Also it is contemplated that the keeper structure may be of a type presenting spaced keeper surfaces between which the bolt and housing assembly is receivable, so that in latched position the bolt and housing assembly is held in dove-tail relation with the keeper parts. Merely as illustrative, the keeper structure, generally indicated at 35, see for example Figs. 5 to 7, comprises an upper portion or member 36 presenting a downwardly facing horizontal shoulder 37 engageable by the top surface of the housing 15, and a spaced lower portion or keeper member 38 having an inclined surface 39 engageable by the bolt during the course of its camming and take-up rotation.

As previously indicated, the invention is primarily concerned with blocking or dogging the bolt against antilatching rotation from any of different latched positions assumed by the bolt during the course of its movement along the inclined keeper surface 39. In the Figs. 1 to 7 form of the invention, the blocking means comprises a dogging element 40 positioned between the inside of the bolt and the spacer washer 42 and rotatably mounted for movement with and relative to the bolt on pin 43 carried by the bolt. Rotation of element 40 about pin 43 and relative to the bolt is permitted by providing the dogging element with an arcuate slot 44 through which the bolt pin 19 passes. At its keeper lower engaging end, the dogging element has a U-shaped portion 45 extending across the bolt and continuing in an arm extension 46, see Fig. 3, which is rotatably on the reduced end portion 47 of the pin 43. This U-shaped portion of the element is so arranged for engagement with the nose 48 of the keeper and to effect clockwise rotation, as viewed in Figs. 5 to 7, of the element about pin 43. By virtue of its rotatability relative to the bolt, the blocking element portion 45 is engageable with and disengageable from the bolt shoulder 23.

Element 40 also carries a lug 50 which is in the nature of a pawl projecting within opening 51 in the body flange and engageable against any of a series of toothed shoulders 52, in the nature of a ratchet, to block antilatching rotation of the bolt from any of its different latched positions. At its opposite side element 40 has an integral arm 26 extending through slot 27 in the case flange 11, see Fig. 1, the arm continuing in a turned portion 26a and a terminal lug or bend 28 which is displaceable by the operating mechanism 14 of Fig. 2, as will later appear. Relative rotation between the bolt 18 and dogging element 40 is resisted, and the element is urged for rotation in a counterclockwise direction relative to the bolt, as viewed in Fig. 5, by a spring 54 contained within a recess 55 in the bolt, see Fig. 3, the spring ends terminating at 56 and 57 respectively in the bolt and dogging element.

As to the individual mountings and arrangement of the described latch mechanism and keeper parts, it will be readily understood by those familiar with the art that the case and latch structure of Figs. 1 and 2 may be mounted on an automobile door with the case flange 13 generally paralleling the door and flange 11 extending in the plane of the door edge so that the housing 15 and its contained parts project from the door edge. The keeper parts 36 and 38 will be understood to be stationarily mounted on or contained within the opposing face of the using door pillar or frame.

In considering the operation of the mechanism described thus far, assume the door to be swung open with the bolt and dogging element parts in the positions illustrated in Fig. 1 wherein the bolt shoulder 24 is engaged against the housing shoulder 25, and the dogging element portion 45 is held by the thrust of spring 54 against the bolt shoulder 23. Assume now that the door is closed to an initial position corresponding to Fig. 5 in which the top surface of the housing is engaged against the upper keeper surface 37, and the U-shaped terminal 45 of the dogging element is engaged against the keeper nose 48. Such engagement against the keeper produces clockwise rotation of the element 40 relative to the bolt and removal of the pawl lug 50 from its Fig. 1 to that appearing in Fig. 5, wherein the lug will be seen to have been displaced from engageability with the ratchet shoulders 52, with the result that the bolt is freed for antilatching rotation.

As the door is further closed, the dogging element and bolt override the keeper nose 48, the element portion 45 preceding the bolt so that as it enters upon the inclined keeper surface 39 the dogging element undergoes counterclockwise rotation under the influence of spring 54, with the result that by the time the bolt has overridden the keeper nose and arrived at the Fig. 6 position, the dogging element will have rotated to the point of bringing its pawl lug 50 into blocking engagement with the uppermost of the ratchet shoulders 52. The dogging element may also be regarded as having the function of a safety catch by reason of its engageability with the inclined keeper surface in advance of arrival of the bolt in a position of initial latched engagement with the keeper surface. In its Fig. 6 position, element 40 will have rotated to the point of engagement of its cross piece 45 with the bolt shoulder 23. Beyond the Fig. 6 position and continuing to the full latched or home position of Fig. 7, the bolt is urged by spring 31 to have a continuous and progressive camming take-up action and engagement with the inclined keeper surface 39, the effect being of course to continuously crowd the door to fully closed condition. The number and arrangement of the ratchet shoulders 52 may be selected so that by reason of the engageability of the pawl lug 50 with any of the shoulders, the bolt is positively blocked against inadvertent or accidental release from any of its progressive latched positions assumed during the bolt travel between the Figs. 6 and 7 positions.

It is contemplated that any suitable mechanism operable by the usual inside and outside door handles, may be utilized to manually effect release of the bolt from the keeper. Merely as illustrative, Fig. 2 shows the usual outside door handle rotatable spindle 55 to carry an arm 56 engageable against arm 57 of a crank piece 58 pivoted intermediate its ends on pin 59 and urged by coil spring 60 for clockwise rotation against arm 56. The crank arm 57 carries a lug 61 engageable against the end 28 of the dogging element arm 26. The lower arm 62 of the crank piece is connected to and operable by strap 63 connected to the usual inside door handle, not shown. As will be apparent, counterclockwise rotation of crank piece 28 by either the outside operator through arm 56, or the inside operator through strap 63, swings arm 26 downward and therefore rotates the blocking element 40 in a bolt releasing direction. Accordingly, upon release of the blocking element, the bolt and housing are releasable from between the keeper surfaces by pulling open the door.

Fig. 8 illustrates a first variational form of the invention similar to the described embodiment in comprising a housing 65 similar in construction and mounting to housing 15, containing the bolt 66 mounted for rotation on pin 67, the housing being engageable against the upper keeper surface 68 and the lower cam face 69 of the bolt having progressive wedging and take-up action against the lower inclined keeper surface 70. As before, coil spring 71 continuously urges the bolt in a latching direction. Here the dogging element 72 is positioned alongside the bolt and is mounted for rotation on and about the pin 67. The element 72 may carry an arm 73 operable in the same manner as the previously described arm 26 by the Fig. 2 mechanism. Clockwise rotation of element 72 relative to the bolt 66 is resisted by a coil spring 74 contained within an opening 75 in the bolt and bearing against a lug 76 carried by the element and extending opposite and across the bolt face 77. Anti-latching rotation of the bolt from any of its positions of latched engagement along the inclined keeper surface 70 is blocked by a collar 78 having a short trunnion 79 received and confined within recess 80 in the dogging element, collar 78 engaging the inside surface 81 of the housing 65, and also the angular bolt surface 82.

As the bolt and dogging element assembly moves against the keeper as the door is closed, the initial engagement of the dogging element portion 76 against the keeper nose, rotates the element against the resistance of spring 74 clockwise in relation to the bolt, thus displacing roller 78 from wedging or clutching interengagement with the housing and bolt surfaces 81 and 82. As soon as the element portion 76 and bolt have overridden the keeper nose, spring 74 returns the elements to the Fig. 8 position in relation to the bolt, bringing roller 78 into wedging engageability with both the housing and bolt surfaces with the result that the bolt becomes blocked from inadvertent antilatching rotation. As will be understood, the roller 78 becomes released upon independent rotation of the dogging element, as by displacement of arm 73 through the Fig. 2 mechanism.

The variational form of the invention shown in Figs. 9 to 11 differs essentially from the previously described embodiments in that the latching mechanism generally indicated at 85 and as shown in Fig. 10 is adapted to be stationarily mounted on the door pillar, for cooperation with the manually releasable keeper mechanism generally indicated at 86 in Fig. 9, carried by the door. This variational form further differs in the more specific feature of embodying a dogging means which is connected directly to or carried by the bolt for bodily and pivotal movement therewith.

The latch device 85 comprises a body 87 which may be die formed to include the flange or mounting portion 88 and the open bottom bolt housing 89. The bolt 90 is pivotally carried on pin 91 terminating at its outer end in the housing 89 and at its inner end in plate 92. The latter contains an opening 93, one edge of which is shaped to present the toothed or ratchet sequence of blocking shoulders 100. Rotation of the bolt in an antilatching direction is resisted by the coil spring 101 contained within the bolt recess 102 and terminally engaged against lug 103 struck out of plate 92, and within the bolt recess 104. Pivotally mounted on the bolt-carried pin 105 is the blocking pawl 106 which has a turned end 107 engageable against the blocking shoulders 100. The element 106 is urged against the toothed edge of the opening 99 by coil spring 108 bearing at 108a against the element and received at its opposite end 109 within an opening in the bolt.

The keeper parts, as indicated by the broken lines in Fig. 9 may be of the general type disclosed in my Patent No. 2,689,759, issued September 21, 1954 and is shown to include an upper keeper part 110 engageable against the top surface of the housing 89, and a lower keeper part 111 engageable by the blocking element 106 and the bottom curved face 90a of the bolt, in essentially the same relation as exists between the bolt and keeper parts in the previously described embodiments. The upper keeper part 110 comprises a piece 112 pivotally mounted at 113 and urged for rotation in the direction of the arrow, by coil spring 114. The piece 112 has a bottom cam surface 115 engageable against the top surface of the housing 89. The lower keeper part 111 comprises an arm 116 pivotally mounted intermediate its ends on pin 117 and presenting an inclined surface 118 engageable by the bolt surface 112 after the bolt has overridden the keeper nose 119. The lever 116 is releasably held in the bolt latching position illustrated in Fig. 8, by a blocking arm 120 pivotally carried on pin or shaft 121 and engageable at 122 against the arm 116 to prevent its movement down away from the bolt. As will be understood, the arm 120 may be actuated through any suitable connections with the usual door operators or handles to release the arm from blocking engagement with the keeper lever to release the latter from holding engagement with the bolt, and thereby permit opening of the door.

Considering now the operation of the latch and keeper combination, assume the door to be open and with the door-carried keeper parts to be in the Fig. 9 position, with the pillar-carried latch device to have its parts in substantially the positions illustrated. As the keeper parts 86 move from the right against the stationary latch assembly 85, the keeper nose 119 engages the dogging element face 106a and rotates the element about pin 105 to a degree releasing the pawl lug 107 from a position of engageability with any of the blocking shoulders 100. Thereafter, as the bolt surface engages and overrides the keeper nose, the dogging pawl is retained in the indicated released position until the bolt enters and starts its camming and take-up movement down along the inclined keeper surface whereupon, by virtue of its disengagement from the keeper, the element 106 is urged by spring 108 against the toothed series 100, thus becoming positioned to block the bolt against releasing rotation from any of its latched positions corresponding to the blocking shoulder locations. As the bolt engages along the lower inclined keeper surface 118, the upper keeper element 110 engages against the top surface of the bolt housing 89 and thereafter, under the influence of spring 114, exerts a downward camming thrust against the housing tending to promote the camming and take-up movement of the bolt along the lower keeper surface.

Figs. 12 and 13 illustrate another embodiment of the invention as applied to a sliding bolt latch mechanism having spring-urged progressive camming and take-up engagement with a keeper. Here the keeper structure, generally indicated at 125 is shown to comprise a plate 126 adapted to be mounted on the door pillar and carrying a keeper 127 having an upper horizontally extending surface 128 and a lower inclined bolt engaged surface 129. The latch mechanism assembly 130 carried by the door mounted case 131 comprises an upper lug 132 having ears 133 extending through the case flange 134 and securing the lug thereto. Spaced below the lug 132 is the latch assembly 135 which comprises inclined housing 136 secured to the case flange by the turned ears 137 and containing the bolt 138 having an upper portion 139 projecting out of the upper open end 140 of the housing for engagement against the inclined keeper surface 142. The bolt is received within a U-shaped member 141 having side portions 143 extending along opposite sides of the bolt as shown in Fig. 13, and an end portion 144 extending transversely beyond the upper end of the bolt. Antilatching sliding movement of the bolt along the inclined housing surface 145 is resisted by coil spring 146, and relative longitudinal movement of the bolt and member 141 is yieldably resisted by coil spring 147 interposed between the end portion 144 of the member and the base of the bolt recess 148 containing the spring. The member 141 carries a lug 149 projecting inwardly through a slot 150 in the case flange 134 so as to be engageable by a suitable door handle operating mechanism, not shown, for retraction of the bolt from latched position through movement of member 141 and spring 147. The side portions 143 of member 141 each contain a recess 151 in which is journalled the trunnions 152 of a wedging roller 153 which is engageable against both the top undersurface 154 of the housing, and against the inclined bolt surface 155.

In considering the operation of the Fig. 12 assembly, assume the door to be moved from open toward closed position with the parts of the latch assembly 135 positioned as shown in Fig. 12 wherein the bolt displacement under the influence of spring 146 is limited by the engagement of lug 149 with the upper end of slot 150. Upon engagement of the end portion 144 of member 141 with the keeper nose 156, the member is displaced relative to the bolt against the resistance of spring 147, releasing roller 153 from confinement between surfaces 154 and 155, and thereby releasing the bolt for antilatching movement as the bolt end engages and underrides the keeper nose. Thereafter, member 144 upon advancing to the point of disengagement from the keeper is thrust forward relative to the bolt by spring 147, the member carrying with it roller 153 which is brought into engagement with the housing and bolt surfaces 154 and 155. Spring 146 then urges the bolt along the keeper surface with a progressive camming take-up action tending to crowd the door to full home position. As will be apparent, by reason of the confinement of the wedging roller 153 between the bolt and housing surfaces, the bolt is blocked against antilatching displacement from any of its positions of latched engagement with and advancement along the keeper. As the bolt underrides the keeper, the door-carried lug 132 engages against the upper surface 128 of the keeper 127 with the result that the keeper is brought into dove-tail confinement between the spaced lug and spring urged bolt parts of the assembly 130.

Fig. 14 illustrates fragmentarily a modified form of dogging means applicable to the Fig. 12 form of the invention, and particularly in the substitution for the blocking roller 153 and its control part 141, of a ratchet and pawl type of blocking means. Here the bolt 160 carried by the case 161 for sliding movement under the influence of spring 162 has latched wedging and take-up engagement against the under surface 163 of the keeper 164. Pawl 166 pivoted on the bolt-carried pin 167 has a turned end 168 forming a lug engageable against the ratchet or blocking shoulders 169. The pawl has an arm portion 170 and a transverse end portion 171 against which bears a coil spring 172 received within opening 173 in the bolt.

As the door-carried bolt asembly moves against the keeper, the latter is engaged first by the pawl end portion 171 with the result that the pawl is rotated counterclockwise to release lug 168 from engageability with the blocking shoulders 169. Thereafter the pawl underrides the keeper nose and the pawl, under the influence of spring 172 swings lug 168 against the ratchet series shoulders thus positioning the pawl to prevent antilatching displacement of the bolt from its successive latched positions reached as it advances along the keeper. The dogging pawl and bolt may be released by any suitable means, such as by providing the pawl with a lug 175 projecting outwardly through slot 176 in the case so that the lug may be accessible for engagement by an appropriate operator, not shown, functioning to release the pawl from the ratchet shoulders and displace both the pawl and bolt in antilatching relation to the keeper.

Figs. 15 to 17 illustrate a further variational form of the invention differing primarily from the first described embodiment in that it employs a body or case mounted pawl engageable with blocking shoulders formed directly on the bolt itself. Here the pillar-carried keeper structure, generally indicated at 180, is shown to present a recess 181 into which the latch assembly generally indicated at 182 is movable, the keeper presenting an upper horizontally extending and downwardly facing shoulder 183 and an inclined bolt engaging surface 184. The door-carried body or case structure 185 includes the open bottom housing 186 containing bolt 187 mounted for pivotal movement on the pin 188 against the resistance of coil spring 189 contained within the bolt recess 190, one end of the spring bearing against the bolt within its recess 192, see Fig. 15, and the other end of the spring having a stationary bearing, as against pin 193. Here the blocking or pawl element comprises a plate member 194 having an opening 195 to receive pin 193 on which the element is pivoted for oscillatory movement. The blocking element contains an arcuate slot 196 which receives the bolt pin 188 and permits oscillation of the element relative to the bolt. The element carries a blocking projection or pawl 197 engageable against shoulders 198 formed on the bolt as indicated in Fig. 15. Engagement of pawl 197 against the bolt may occur merely by downward gravity movement of the element 194 about its pivot 193, or the pawl may be spring-urged, as by coil spring 198 bearing against the element. The latter is releasable from blocking engagement of the bolt by an appropriate door handle actuated operator 199 engageable against arm 200 carried by the element and projecting through slot 201 in the case.

In the open position of the door, the latching mechanism parts assume substantially the position shown in Fig. 15. Upon closing movement of the door, surface 202 of the element first engages against the keeper nose 203 to displace the element clockwise and swing the pawl 197 out of the path of the bolt shoulders 198. Upon engagement of its surface 204 with the keeper, the bolt is free to override the keeper against the resistance of spring 189 by virtue of the antecedent release of the pawl. Upon movement of the pawl portion 202 into the keeper and after the bolt has at least just overridden the keeper nose to a safety catch position, the pawl 197 is restored into engagement with the bolt and to a position of engageability against shoulders 198 to block the bolt against antilatching rotation form successive latched positions reached by the bolt as it is spring urged in its camming and take-up movement along the inclined keeper surface 184.

To release the latch for opening movement of the door, the handle operated member 199 is brought down against the blocking element arm 200, swinging the element 194 clockwise about its pin 193 to release pawl 197 from engageability with any of the shoulders 198. As the pawl is thus swung away from the shoulders, face 205 of the blocking element is swung into engagement with shoulder 206 on the bolt so that continuous clockwise rotation of the element causes it to correspondingly rotate the bolt out of latched confinement within the keeper.

I claim:

1. A dovetail latch mechanism comprising: a bolt structure and coacting keeper structure, one adapted to be mounted on a support member and the other on a door which is movable relative to said member in opening and closing directions; said keeper structure having two bearing surfaces facing in generally opposite upward and downward directions respectively, a first of said bearing surfaces having a portion disposed essentially parallel to the direction of closing movement of the door; the second of said surfaces being a bolt engaging surface inclined relative to said direction of closing movement; said bolt structure including a body, a bolt mounted to said body for movement relative thereto in opposite latching and antilatching directions and having a camming surface engaging and exerting thrust against said second keeper surface when in latched position, and means carried by said body defining a surface engaging against said first keeper surface to oppose said thrust; said keeper structure having a portion positioned to deflect said bolt in antilatching direction upon door closing movement; said second keeper surface being positioned to engage the bolt after said deflection and being inclined progressively away from said bolt in the direction of door closing movement, said bolt structure including a spring continuously urging the bolt in latching direction and yieldingly resisting said deflection in antilatching direction; the bolt and keeper being progressively cammed relative to each other in door closing direction as a result of spring-urged movement of the bolt while in engagement with said second surface; said bolt structure including a releasable dogging means operatively interposed between the bolt and body, and means mounted on said bolt structure and presenting a stop shoulder engageable by said dogging means to positively block antilatching movement of the bolt from a latched position beyond which the bolt and keeper are free for further door closing movement; said spring acting to disengage said stop shoulder from said dogging means at said latched position of the bolt so that the range of spring-urged camming movement of the bolt in latching direction is sufficiently extended to continue camming the keeper and body in door closing direction beyond said position at which the dogging means is effective to block antilatching movement of the bolt; said bolt structure including means movable with the dogging means and positioned to engage the keeper structure upon door closing movement and be deflected thereby in a direction to release the dogging means from blocked relation with said shoulder and said latch mechanism including manually operable means for releasing said bolt from latched engagement with the keeper.

2. A latch mechanism as recited in claim 1, including a second spring urging said dogging means in dogging relation to the bolt.

3. A latch mechanism as recited in claim 1, in which there is a plurality of shoulders positioned to block antilatching movement of the bolt from a plurality of different latched positions.

4. A latch mechanism as recited in claim 3, including means movably mounting said dogging means to one of said bolt and body parts, the other of said parts and said dogging means having interengageable portions one of which has a series of shoulders engageable by said other portion in said different bolt positions to retain the bolt against antilatching movement from said positions.

5. A latch mechanism as recited in claim 1, including means pivotally attaching said bolt to said body.

6. A latch mechanism as recited in claim 1, including means mounting said bolt to said body for pivotal latching and antilatching movement relative thereto, and means pivotally mounting said dogging means to said bolt for movement therewith and relative thereto, said means engageable by the dogging means comprising a stationary abutment carried by said body and engageable by said dogging means to retain the bolt against antilatching pivotal movement.

7. A latch mechanism as recited in claim 6, including a second spring urging said dogging means pivotally relative to said bolt toward a position of holding engagement with said abutment.

8. A latch mechanism as recited in claim 7, in which said bolt and said abutment have interengageable portions one of which has a series of shoulders engageable by said other portion in said different bolt positions to retain the bolt against antilatching movement from said positions.

9. A latch mechanism as recited in claim 1, including means mounting said bolt to said body for pivotal latching and antilatching movement relative thereto, means pivotally mounting said dogging means to said bolt, and a second spring urging said dogging means pivotally relative to said bolt toward a position for holding said bolt against antilatching movement.

10. A latch mechanism as recited in claim 1, including means mounting said bolt to said body for reciprocal sliding movement in latching and antilatching directions.

References Cited in the file of this patent

UNITED STATES PATENTS

| | | |
|---|---|---|
| 712,899 | Bartholomew | Nov. 4, 1902 |
| 830,545 | Voight | Sept. 11, 1906 |
| 1,164,743 | Musselman | Dec. 21, 1915 |
| 1,450,624 | Woina | Apr. 3, 1923 |
| 1,455,251 | Hurd | May 15, 1923 |
| 1,486,552 | Swanson | Mar. 11, 1924 |
| 1,497,947 | Schwab | June 17, 1924 |
| 2,246,787 | Dall | June 24, 1941 |
| 2,301,557 | Marple | Nov. 10, 1942 |
| 2,582,923 | Dall | Jan. 15, 1952 |

FOREIGN PATENTS

| | | |
|---|---|---|
| 256,940 | Germany | Feb. 22, 1913 |